(12) United States Patent
Hoover et al.

(10) Patent No.: US 8,493,633 B2
(45) Date of Patent: Jul. 23, 2013

(54) MEDIA HANDLING AND UNIFORMITY CALIBRATION FOR AN IMAGE SCANNER

(75) Inventors: Martin Edward Hoover, Rochester, NY (US); Steven Robert Moore, Pittsford, NY (US); Kathleen A. Feinberg, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 409 days.

(21) Appl. No.: 12/840,222

(22) Filed: Jul. 20, 2010

(65) Prior Publication Data

US 2012/0019875 A1    Jan. 26, 2012

(51) Int. Cl.
*H04N 1/04* (2006.01)

(52) U.S. Cl.
USPC ............ 358/474; 358/475; 358/498; 399/367

(58) Field of Classification Search
USPC ................. 358/474, 597, 496, 406, 408, 449, 358/498, 296; 399/367
See application file for complete search history.

(56) References Cited

U.S. PATENT DOCUMENTS

| | | | | |
|---|---|---|---|---|
| 4,304,345 A * | 12/1981 | Carlin | | 226/74 |
| 5,285,293 A * | 2/1994 | Webb et al. | | 358/471 |
| 5,988,784 A * | 11/1999 | Takemura et al. | | 347/8 |
| 6,735,327 B1 * | 5/2004 | Shofner et al. | | 382/111 |
| 7,034,967 B2 * | 4/2006 | Ochi et al. | | 358/487 |
| 7,359,097 B2 * | 4/2008 | Oomori et al. | | 358/498 |
| 7,433,097 B2 * | 10/2008 | Spears | | 358/504 |
| 7,457,006 B2 * | 11/2008 | Wilsher et al. | | 358/461 |
| 7,777,922 B2 * | 8/2010 | Sakakibara | | 358/474 |
| 7,798,407 B2 * | 9/2010 | Hall et al. | | 235/454 |
| 8,199,383 B2 * | 6/2012 | Tokutsu et al. | | 358/498 |
| 8,251,480 B2 * | 8/2012 | Moriyama et al. | | 347/16 |
| 8,348,403 B2 * | 1/2013 | Ueda et al. | | 347/86 |
| 8,368,025 B2 * | 2/2013 | Kasai et al. | | 250/361 R |
| 2007/0160399 A1 * | 7/2007 | Sheng et al. | | 399/367 |

* cited by examiner

*Primary Examiner* — Negussie Worku
(74) *Attorney, Agent, or Firm* — Joseph E. Root

(57) ABSTRACT

A system for media handling and uniformity calibration for an image scanner includes an optical window, an assist roller, an adjustment mechanism, and a calibration strip. The assist roller receives and guides media through a gap between the assist roller and the optical window. The adjustment mechanism is integrated with the assist roller for controlling the distance between the assist roller and the optical window for smooth passage of media. The controlled reflectivity calibration strip connected to the adjustment mechanism facilitates sensor calibration, such as flat field correction. The adjustment mechanism moves to position the calibration strip in alignment with the optical window whenever sensor calibration is desired.

8 Claims, 4 Drawing Sheets

MEDIA HANDLING AND UNIFORMITY CALIBRATION FOR AN IMAGE SCANNER

TECHNICAL FIELD

Embodiments of the present invention relate to image-forming devices and more particularly, to image scanners.

BACKGROUND

Image scanners are available in a number of configurations, based both on physical layout and on document-handling capabilities. Typical scanner formats include flatbed and hand-held scanners as layout options, and rotary and sheetfed scanners as document-handling capabilities. Sheetfed document scanners are often used to process a large number of documents in short time, typically in connection with large-scale document printing operations or data input applications. The scanners are characterized by stationary scanning heads, together with media handling assemblies that traverse individual documents past the scanning head at relatively high speed.

To produce accurate, high-quality images, it is advantageous for an image-forming system to incorporate some form of image scanner for monitoring output image quality. The image scanner may be arranged to be off-line from the image-forming system, such as a sheetfed desktop scanner, or it may be arranged to be inline with the image-forming system. An advantage of inline scanning is that it provides opportunity to monitor and provide feedback to the image-forming system in real time for maintaining output quality. Inline scanners can be utilized in digital printing systems for internal image based control, image based diagnostics, or monitoring and verifying printed media.

One exemplary application for an inline scanner is the measurement and adjustment of the absolute printed image position upon the media, here referred to as image on paper (IOP) registration. The absolute position of a printed image relative to a media sheet is critical for an application where an extended image is formed across adjacent pages within a booklet, for example. This measurement task in turn requires accurate detection of sheet edges, providing accurate starting points for calculating exact image locations. The inline scanner media handling components must not only move the media sheets rapidly, but each sheet must be held sufficiently flat to remain within the scanner focal range, and each sheet edge must have sufficient optical contrast, enabling correct media edge detection at the image scanning location.

Since the inline scanner is composed of imperfect components, it is necessary that the associated image sensor within the scanner be calibrated on a periodic basis. Image sensor calibration, such as flat-field correction, improves quality of digital images by correcting sensor output at the pixel level, compensating for each pixel's gain and its dark current (pixel output when no input exists, or dark frame). Pixel gain measures the variation in sensor output as a function of the input. The gain is usually a linear variable and is simply the ratio of the input and output signals. Flat-field correction requires a plain, white background image (containing no cellular or fluorescent material), providing a standard input against which to measure output variations. Based on output variations, the sensor can be calibrated.

Conventional inline scanners cannot provide both a dark and light background, and therefore, cannot offer both image registration and uniformity calibration on the same device. Moreover, present sheetfed scanners include a fixed gap between two media handling elements, such as a glass plate and a baffle or media guide, for holding media within the focus of the scanner sensor (conventional scanners use full width array sensors, which have a very short depth of focus (1-2 mm)). Because of that shallow depth of focus, the printed sheet should be as close to the glass plate as possible. The fixed gap, however, causes difficulties in dealing with media of different thicknesses. Whether the gap is fixed based on a light media or heavy media thickness, the gap will be incorrect for a certain proportion of the input. A relatively narrow media gap will not accommodate thick media, leading to jamming. Conversely, a large media gap will not produce accurate images on thin media, particularly detailed images.

Therefore, a need exists for an inline scanning system that allows accurate image reading; accurate media edge detection; and periodic, automatic uniformity calibration. Moreover, an inline system that effectively handles media of different thickness, provides accurate scans of media having different thicknesses, and eliminates jamming is also needed.

SUMMARY

The present disclosure provides an image scanner employing an optical window, an assist roller, and an adjustment mechanism. The assist roller having a substantially non-reflective surface is positioned in movable spaced relation to the optical window for receiving media. The adjustment mechanism is operatively connected to the assist roller for moving the assist roller to adjust the distance between the optical window and the assist roller. A substantially reflective calibration strip is operatively connected to the adjustment mechanism such that the rotation of the adjustment mechanism can position the calibration strip in line with the optical window.

Another disclosed embodiment is an image scanner employing an optical window, an assist roller, and an adjustment mechanism. The assist roller having a substantially non-reflective surface is positioned in movable spaced relation to the optical window for receiving media. The adjustment mechanism is coaxially and operatively connected to the assist roller for moving the assist roller to adjust the distance between the optical window and the assist roller. A substantially reflective calibration strip is operatively connected to the adjustment mechanism such that the rotation of the adjustment mechanism can position the calibration strip in line with the optical window at intervals when media scanning is not occurring.

Certain embodiments describe a printing apparatus for printing media. The printing apparatus receives media for printing from an input media path and delivers printed media to an output media path. An image scanner is operatively connected to the output media path, employing an optical window, an assist roller, and an adjustment mechanism. The assist roller having a substantially non-reflective surface is positioned in movable spaced relation to the optical window for receiving the printed media from the output media path. The adjustment mechanism is operatively connected to the assist roller for moving the assist roller to adjust the distance between the optical window and the assist roller, allowing printed media passage. The calibration strip is operatively connected to the adjustment mechanism such that rotation of the adjustment mechanism positions the calibration strip in line with the optical window at intervals when media scanning is not occurring.

DETAILED DESCRIPTION

The following detailed description is made with reference to the figures. Preferred embodiments are described to illustrate the disclosure, not to limit its scope, which is defined by the claims. Those of ordinary skill in the art will recognize a number of equivalent variations in the description that follows.

Overview

The present disclosure describes an image scanner design to achieve integrated media handling, image content reading, and uniformity calibration for media of different thicknesses. The image scanner includes an image-sensing module that converts light impinging thereon, such as light reflected from a sheet, into a useable electrical signal. Further, the image scanner employs an optical window, an assist roller, and a calibration strip attached to an adjustment mechanism. The assist roller has a substantially non-reflective surface, which aids in accurately detecting the edges of the media entering the image scanner. The assist roller is rotated so that its surface speed approximately matches the delivery speed of sheets entering the scanner. Coaxial mounting of the adjustment mechanism on the assist roller effectively controls distance (gap) between the optical window and the assist roller. The gap can be adjusted to allow an approximately constant spacing from the printed surface of the media and the optical window, regardless of media thickness. Sheets are reliably conveyed past the optical window since the assist roller has a surface velocity approximately equal to the delivery speed of the sheet. Further, the adjustment mechanism can rotate and position the calibration strip in line with the optical window, facilitating uniformity calibration in periods when media scanning is not occurring.

The image scanner's dual background (the substantially non-reflective assist roller and substantially reflective calibration strip) facilitates image content readings, media edge detection, and uniformity calibration, providing a compact and simple design. This design offers the capability of optimizing image scanner settings to eliminate jamming by allowing media of variable thickness or accidental input of multiple media at one instant to pass through the adjustable gap. Moreover, this image scanner may be implemented inline in digital printing devices for internal image based control, image based diagnostics, or monitoring and verifying the printed media.

In the following description the terms "sheet," "media," "document," "page," or "paper" refer to sheets of paper, plastic, cardboard, or other suitable physical substrate for printing images, whether precut or initially web fed and then cut. The terms "media," "sheet," "document," "page," and "paper" are interchangeable and used throughout the disclosure.

DESCRIPTION OF EMBODIMENTS

Figure 1:
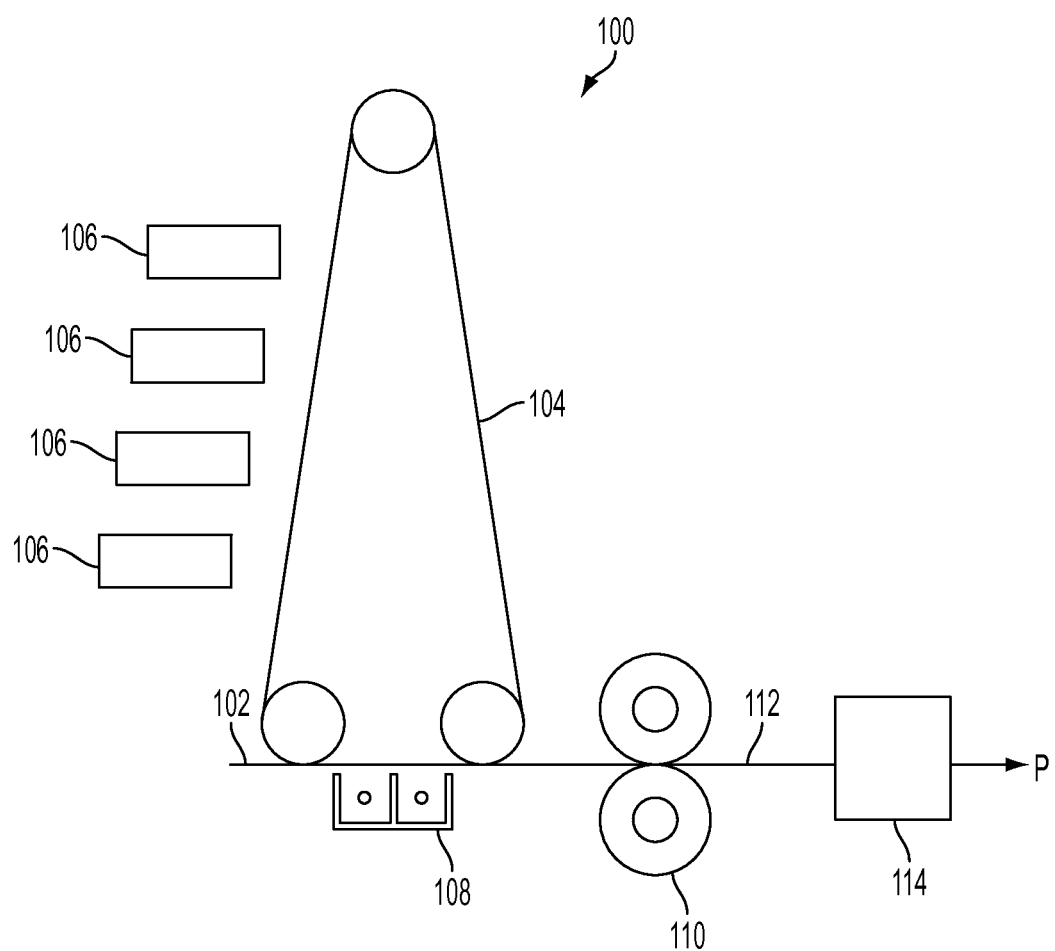
FIG. 1 illustrates a schematic diagram of an exemplary operating environment for an image scanner.

FIG. 1 is a schematic diagram illustrating an exemplary operating environment, which may be a digital printing device 100, including an input media path 102 for receiving media, a photoreceptor 104 rotating past imaging stations 106, a transfer station 108, a fusing station 110, and an output media path 112 for outputting printed media. Each imaging station, under digital control, places toner according to a color separation of a desired image on the photoreceptor 104, and the total color image is subsequently transferred to media at the transfer station 108. Further, the printed media moves in a process direction P through the fusing station 110, and continues past an image scanner 114, which scans the printed media. The image scanner 114 will be described in detail with reference to FIGS. 2, 3 and 4. The digital printing device 100 could alternatively employ other image-forming technology known in the art, such as ink jet, lithography, or thermal printing.

Figure 2:
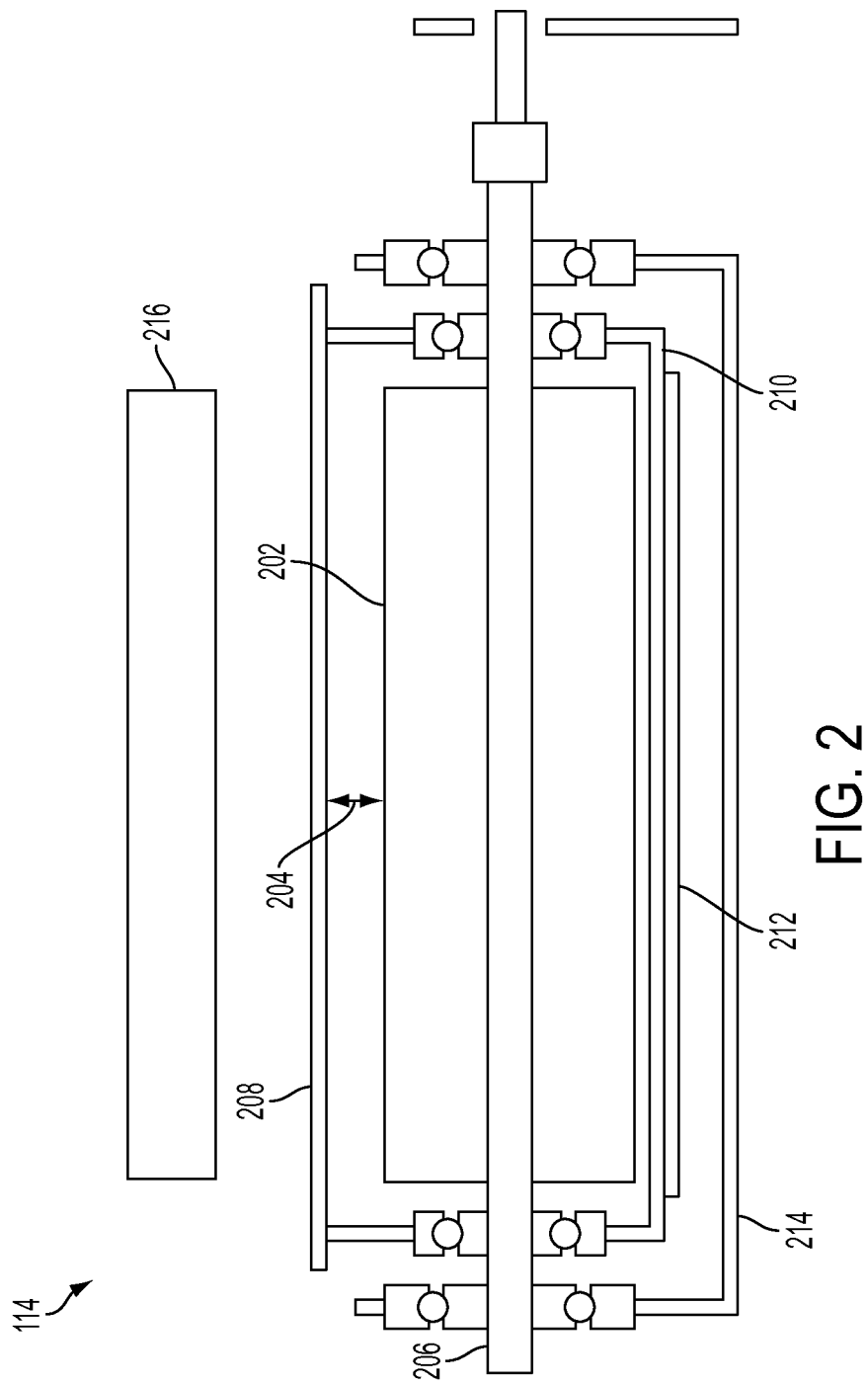
FIG. 2 is a cross sectional schematic depiction of the exemplary image scanner for media handling and uniformity calibration.
Figure 3:
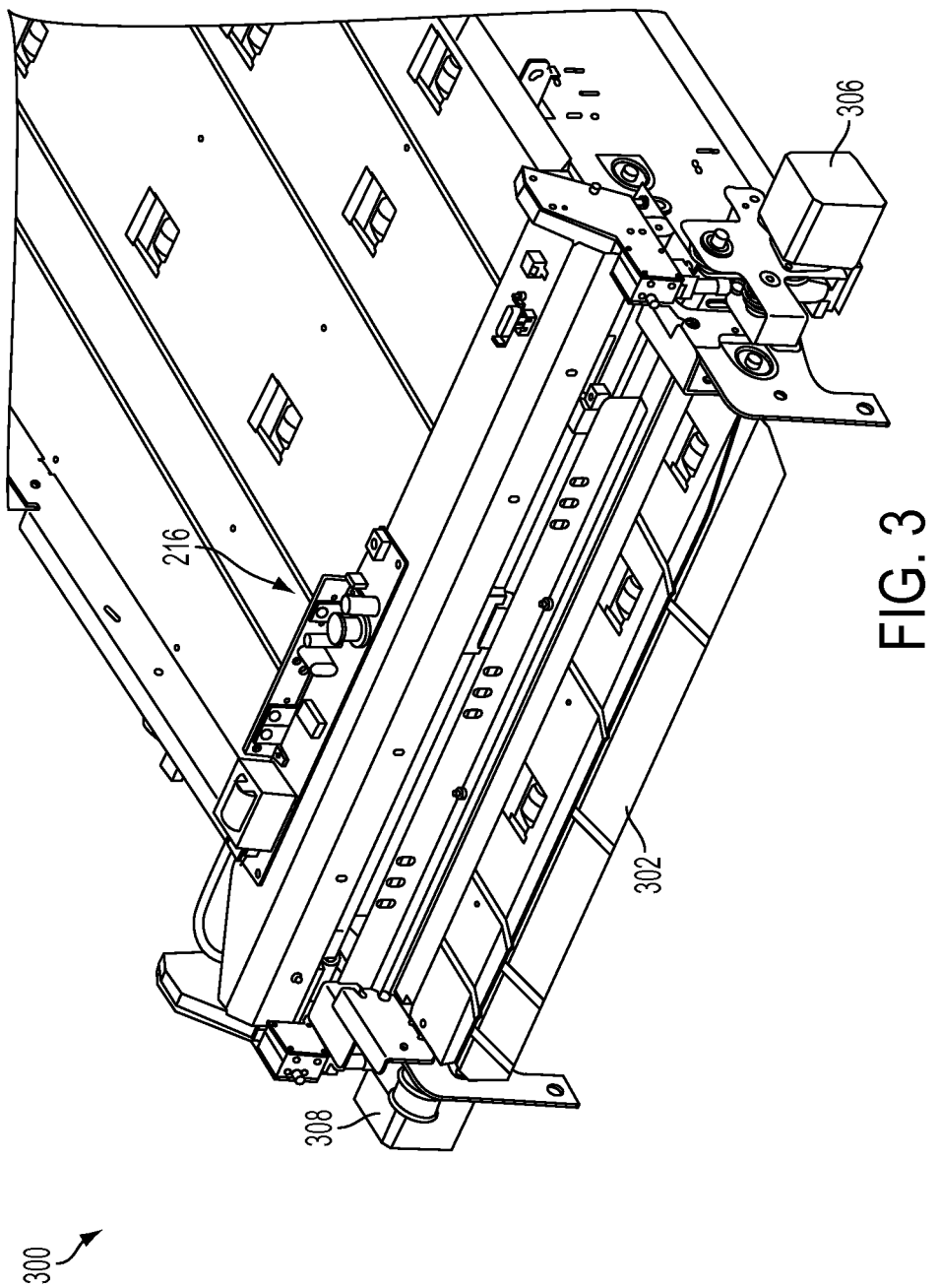
FIG. 3 is a pictorial representation of the image scanner shown in FIG. 2.
Figure 4:
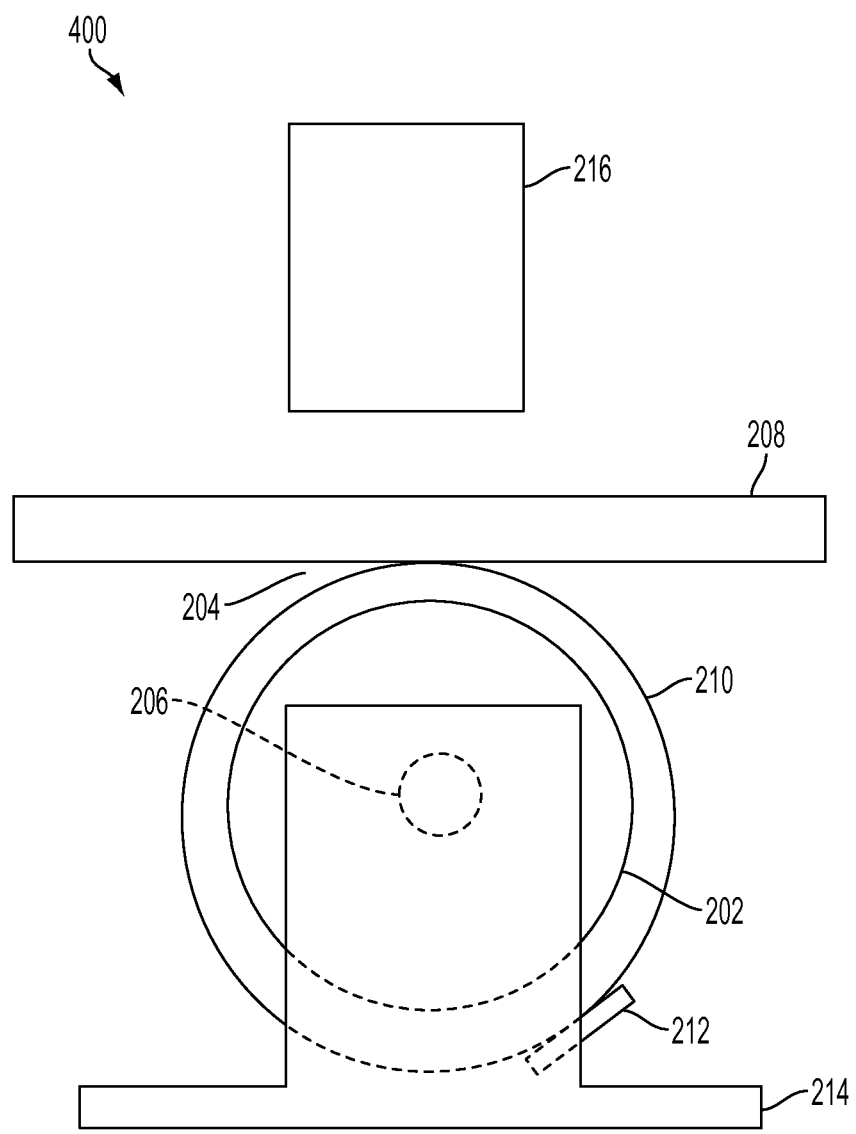
FIG. 4 is a sectional view of the image scanner shown in FIG. 3.

FIGS. 2, 3, and 4 variously depict the exemplary image scanner 114, illustrating its functional and structural components. This scanner may be employed within a device such as a copier, a printer, a facsimile machine, or any imaging device that requires image-based control, analysis, or diagnostics. Here, for ease of description, the image scanner 114 is considered as an inline image scanner in the digital printing device 100. It will be understood that this embodiment is merely exemplary, and the image scanner 114 may have numerous other implementations and applications, such as a standalone sheetfed scanner, without departing from the scope of the present disclosure.

FIG. 2 schematically represents the image scanner 114, generally including an assist roller 202 and associated components, mounted directly below and optical window 208. An image-sensing module 216 is located immediately above the optical window 208, and the entire image scanner 114 may be encased in a frame 214. The assist roller 202 rotates on a shaft 206, driven by a motor (not shown). The assist roller 202 lies immediately below the optical window 208, separated by an adjustable gap 204, through which the printed media travel. The position of the assist roller 202, and thus the extent of the adjustable gap 204 can be controlled by an adjustment mechanism, such as cam assembly 210.

In the illustrated embodiment, the image-sensing module 216 consists of an array of suitable photosensors. The resulting array is best seen in FIG. 3, extending across the full width of an input printed media path 302, such that the width can be selected as needed for a particular application. The image-sensing module 216 may convert light impinging thereon, such as light reflected from a sheet, into a useable electrical signal. The image-sensing module 216 can include one or more photosensors of any size, along with lenses or other optical elements of any type, such as reductive optics, color filters, polarizing filter, etc.

The assist roller 202 may be movably positioned in relation to the optical window 208 for receiving printed media from the output media path 112, and it performs three main functions. First, the assist roller 202 constrains the printed media into close proximity to the optical window 208 for accurate image scanning Second, because the assist roller 202 is driven (by assist roller drive motor 308, shown in FIG. 3), that roller continuously urges the printed media through the gap 204 as it is being scanned. Third, the assist roller 202 has a substantially non-reflective surface, providing a sufficiently high contrast background for the printed media, thereby facilitating detection of sheet edges, which assists, for example, in IOP registration. In the inline environment discussed here, the assist roller 202 may be driven at approximately the same speed as the printed media, while in the standalone environment; the assist roller 202 may be driven at any suitable speed.

The position of assist roller 202 in relation to the optical window 208 may be controlled by rotating the cam assembly 210 to adjust the gap 204, allowing constrained passage, and accurate scanning of media with different thicknesses. The cam assembly 210 may include one or more cams. To this end, the cam assembly 210 may be coaxially connected with the assist roller 202 such that the cams are located at both the ends of the shaft 206. In the illustrated embodiment, the cam assembly 210 is rotatable about the shaft 206, as shown, and the frame 214, carrying the assist roller 202 and cam assembly 210, "floats," so that its position relative to the optical window varies with the operation of the cam assembly 210. The cam assembly 210 can be driven by any suitable means, as will be apparent to those of skill in the art.

Thus, the gap 204 is adjusted to accommodate various media thicknesses by rotating the cams of cam assembly 210. This adjusted distance corresponding to the gap 204 allows the printed media to be held flat to the optical window 208 relative to the focal plane of the image-sensing module 216. The cam assembly 210 may include one or more cams. Alternatively, those skilled in the art may configure any other suitable mechanism for adjusting the gap 204.

During operation, sheet feeding problems may arise. For example, the system may attempt to feed multiple sheets, or actual sheet thickness may not match the set value, or a damaged sheet may enter the image scanner 114. In any of these the situations, if the gap 204 were rigid, paper jamming would occur. In the preferred embodiment, the image scanner 114 may include compliant members (not shown) mechanically attached to the frame 214, for the purpose of biasing the cam assembly 210 against the optical window 208. In normal operating conditions, the compliant member provides an upward force for maintaining the gap 204 as constant. When the printed media thickness varies due to some unforeseen errors, however, the compliant members allow the media to force the gap 204 wider apart, allowing the thicker media to pass through without jamming the scanner path. In addition, the compliant members force the cams of the cam assembly 210 for maintaining contact between the cam assembly 210 and the optical window 208. The compliant member may be a spring mechanism that may employ a tension/extension, a compression, a torsional, or a compressed gas spring for achieving compliance in the gap 204. In the illustrated embodiment, coil springs may be connected on both the ends of the frame 214.

Depending on the space available in the vicinity of the frame 214, different spring arrangements can be employed in the image scanner 114. In the illustrated embodiment, the assist roller 202, the cam assembly 210, and the frame 214 can be mutually spring loaded with a pivot mounting (not shown) with respect to output transport 112 for maintaining contact with the optical window 208 as a unit. In an alternative embodiment, the surface of the assist roller 202 may be made of soft rubber such that the assist roller 202 facilitates compliance in the gap 204.

As noted above, periodically calibrating the image scanning module 216 is critical for accurate operation. To that end, a calibration strip 212 is provided adjacent to the assist roller 202, as shown in FIG. 2. In the illustrated embodiment, the cams of the cam assembly 210 may be connected together by a full width plate such that the calibration strip 212 may be mounted on the plate surface, and positioned against the optical window 208 for uniformity calibration of the image scanner 114. Thus, during normal operation of the system, the calibration strip 212 is positioned out of view of sensor 216. Whenever calibration is required (in between scans or at predetermined times), the cam assembly 210 may rotate the calibration strip 212 from a rest position to an operative position, in close proximity to the optical window 208. The assist roller 202 is simultaneously cammed away from the optical window 208 as the calibration strip enters the field of view of sensor 216. By moving the calibration strip 212 at a low speed past the optical window, a white level uniform profile can be derived by averaging a number of scan lines of the full-width calibration strip 212, such that a spot of dirt on the calibration strip 212 is averaged out, eliminating any streak in the resulting flat field calibrated images from the image scanner 114. A number of alternative structures and positioning methods can be employed provide a calibration strip 212 in a rest position out of the viewing area of the scanning module 216 and to move that strip into calibration position when required, as will be clear to those in the art.

FIG. 3 is a pictorial representation and FIG. 4 is sectional view of the image scanner 114 shown in FIG. 3. FIG. 3 shows the input printed media path 302 for receiving printed media, the image-sensing module 216, a cam drive motor 306, and the assist roller drive motor 308. The assist roller drive motor 308 drives the assist roller 202 at or very near to the delivery speed of the printed media facilitating scanning of the prints through the gap 204. The cam drive motor 306 is a positioning motor such that it drives and positions the cam assembly 210 relative to a home sensor (not shown). The home sensor facilitates determination of the cam position for moving the calibration strip 212 into the view of the image scanner 114 when no printed media is being received at the input printed media path 302.

In the illustrated embodiment, a control system (not shown) may be coupled to the cam assembly 210 and motors 306 and 308, for maintaining and providing the gap 204 and the assist roller 202 velocity as a function of media attributes such as thickness, size, and delivery speed. The information corresponding to the printed media thickness may be supplied manually or electronically to the control system. On receiving media thickness information, the cam drive motor 306 may regulate the position of the cam assembly 210 to adjust the gap 204, allowing smooth printed media passage. In another embodiment, a sensor mechanism (not shown), may sense the thickness of printed media and provide this information to the control system for further processing. In an alternative embodiment, printer settings may be used to transfer the control information related to thickness of printed media to the control system. For example, printer settings of the digital printing device 100 are appropriately set depending on the thickness media. In case media thickness changes, the printer settings may be modified and information related to this modification may be transferred to the control system.

In one implementation, data integrity checking or print verification systems may employ the image scanner 114 described in the present disclosure. For example, a digital printing system may be utilized for printing credit card statements. The credit card statements require verification of the printed information for which an integrity checking software can be installed in the digital printing system. The integrity checking software facilitates the image scanner 114 for validating the printed information and checking whether each credit card statement is printed accurately by scanning the media entering the digital printing system.

In another implementation, the image scanner 114 is incorporated into a barcode reader. For example, a system requiring barcode reading may receive a page having a barcode at multiple locations, such as center, right, and left. Alternatively, the barcode can be hidden on the page. Variation in the location of the barcode necessitates using multiple cameras for capturing and reading the barcode. The image scanner 114 may be integrated with the system requiring barcode reading. This integration assists scanning of the page such that the barcode can be identified automatically irrespective of its location.

It should be noted that the description below does not set out specific details of manufacture or design of the various components. Those of skill in the art are familiar with such details, and unless departures from those techniques are set out, techniques, designs and materials known in the art should be employed. Those in the art are capable of choosing suitable manufacturing and design details.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An image scanner, comprising:
   an optical window;
   an assist roller positioned in movable spaced relation to the optical window for receiving media;
   an adjustment mechanism, operatively connected to the assist roller, for moving the assist roller to adjust the distance between the optical window and the assist roller, the adjustment mechanism being coaxial with the assist roller; and
   a calibration strip, operatively connected to the adjustment mechanism, for rotating and positioning the calibration strip in alignment with the optical window at selected intervals when media scanning is not occurring;
   wherein the adjustment mechanism can be disposed in a rest position, in which the assist roller is positioned to receive media, and the calibration strip is rotated out of view of the scanner, or an operative position, in which the calibration strip is rotated into alignment with the optical window, interposed between the optical window and the assist roller, and the assist roller is cammed away from the optical window a distance sufficient to allow the calibration strip to rotate into the operative position.

2. The image scanner of claim 1, wherein adjustment mechanism regulates the distance between optical window and assist roll to accommodate media of different thicknesses.

3. The image scanner of claim 1, wherein the adjustment mechanism includes one or more cams for positioning the assist roller according to media thickness.

4. The image scanner of claim 1, wherein the adjustment mechanism is coaxial with the assist roller.

5. The image scanner of claim 1, further including an image-sensing module.

6. The image scanner of claim 1, wherein the assist roller is substantially non-reflective, facilitating detection of media edges.

7. The image scanner of claim 1, wherein the calibration strip is substantially reflective, facilitating flat field uniformity correction of the image scanner.

8. A printing apparatus for printing media, the apparatus comprising:
   an input media path for receiving media for printing;
   an output media path for outputting printed media;
   a stationary image scanner operatively connected to the output media path, wherein the image scanner comprises:
   an optical window
   an assist roller positioned in movable spaced relation to the optical window for receiving printed media from the output media path;
   an adjustment mechanism, including one or more cams for positioning the assist roller according to media thickness and aligned coaxial with the assist roller, operatively connected to the assist roller, for moving the assist roller to adjust the distance between the optical window and the assist roller for passage of printed media;
   a calibration strip, operatively connected to the adjustment mechanism, wherein the adjustment mechanism positions the calibration strip in alignment with the optical window at selected intervals when media scanning is not occurring;
   wherein the adjustment mechanism can be disposed in a rest position, in which the assist roller is positioned to receive media, and the calibration strip is rotated out of view of the scanner, or an operative position, in which the calibration strip is rotated into alignment with the optical window, interposed between the optical window and the assist roller, and the assist roller is cammed away from the optical window a distance sufficient to allow the calibration strip to rotate into the operative position.

* * * * *